United States Patent
Wong et al.

(10) Patent No.: US 6,175,364 B1
(45) Date of Patent: Jan. 16, 2001

(54) FRAMEWORK AND METHOD FOR INTERFACING A GUI, CONTAINER WITH A GUI COMPONENT

(75) Inventors: Hinkmond B. Wong, Redwood City; George Tharakan, Sunnyvale; Bartley H. Calder, Los Gatos; William A. Shannon, Los Altos, all of CA (US)

(73) Assignee: Sun Microsystems, Inc., Palo Alto, CA (US)

( * ) Notice: Under 35 U.S.C. 154(b), the term of this patent shall be extended for 0 days.

(21) Appl. No.: 08/831,846

(22) Filed: Apr. 1, 1997

(51) Int. Cl.[7] .................................................. G06F 13/00
(52) U.S. Cl. ........................... 345/340; 345/112; 345/339
(58) Field of Search ..................................... 345/112, 115, 345/342, 340, 343, 336, 346, 350, 338, 339, 347, 353; 358/520, 522, 527

(56) References Cited

U.S. PATENT DOCUMENTS

| | | | | |
|---|---|---|---|---|
| 5,305,435 | * | 4/1994 | Bronson ................................ | 345/342 |
| 5,416,901 | * | 5/1995 | Torres .................................. | 345/340 |
| 5,475,812 | * | 12/1995 | Corona et al. ........................ | 345/340 |
| 5,557,298 | * | 9/1996 | Yang et al. ........................... | 345/342 |
| 5,657,462 | * | 8/1997 | Brouwer et al. ..................... | 345/336 |
| 5,659,694 | * | 8/1997 | Bibayan ............................... | 345/342 |
| 5,694,549 | * | 12/1997 | Carlin et al. ......................... | 345/352 |
| 5,739,928 | * | 4/1998 | Scott .................................... | 358/520 |
| 5,745,718 | * | 4/1998 | Cline et al. .......................... | 345/350 |
| 5,825,348 | * | 10/1998 | Ludolph et al. ..................... | 345/115 |
| 5,874,958 | * | 2/1999 | Ludolph .............................. | 345/339 |

OTHER PUBLICATIONS

Gamma, et al., Designs Patterns: Elements of Reusable Object–Oriented Software, "Decorator Object Structural", Chapter 4, pp. 175–184.

* cited by examiner

Primary Examiner—Dennis-Doon Chow
(74) Attorney, Agent, or Firm—Beyer Weaver & Thomas, LLP (57) ABSTRACT

Methods, software and data structures for installing a component in a container suitable for display on a display screen as part of a graphical user interface are disclosed. In one embodiment, a name and desired location for a component are provided. Both the desired component and a component object table that is to be associated with the component are then created. The component object table is arranged to identify both the location and identity of the component. The component object table is then referenced in a container lookup table arranged to associate the component object table with a container at the desired location. In a preferred embodiment, the container is a sliding panel associated with a window suitable for display on the monitor. The sliding panel is capable of supporting a plurality of handles that act as independent sub-containers. The component object table includes a location identifier that identifies an edge of the window that the sliding panel is associated with, and a handle index indicative of a particular handle within the sliding panel.

24 Claims, 9 Drawing Sheets

Naming Table

| | User Name | Class Name |
|---|---|---|
| Entry 1 | | |
| Entry 2 | ⋮ | ⋮ |
| Entry 3 | ⋮ | ⋮ |
| ⋮ | ⋮ | ⋮ |

Component Object Table

| | |
|---|---|
| Handle Index — 454 | Handle Number — 455 |
| Location — 452 | Location Identifier — 453 |
| Class Type — 456 | Class Name Identifier — 457 |
| Instance Name — 458 | Instance Name Identifier — 459 |
| Background Color — 460 | Background Color Identifier — 461 |
| Handle Color — 462 | Handle Color Identifier — 463 |

Figure 5

Sliding Panel Lookup Table

| | Location Field 482 | Handle Index Field 484 | Object Reference Field 486 |
|---|---|---|---|
| Entry 1 | Location Identifier | Handle # | Object Reference |
| Entry 2 | ⋮ 483 | ⋮ 485 | ⋮ 487 |
| Entry 3 | ⋮ | ⋮ | ⋮ |
| ⋮ | ⋮ | ⋮ | ⋮ |

FRAMEWORK AND METHOD FOR INTERFACING A GUI, CONTAINER WITH A GUI COMPONENT

BACKGROUND OF THE INVENTION

The present invention relates generally to methods, data structures and apparatus suitable for interfacing graphical user interface containers with graphical user interface components objects. In a preferred embodiment, the containers that take the form of sliding panels associated with a particular window.

In computer systems, a graphical user interface (GUI) is often used to present information to a user. In a personal computer environment, analogies are sometimes made between the items in a GUI and a person's desk. For example, the initial screen that is displayed when a computer system is booted is typically referred to as a desktop. The desktop can include windows that overlap, folders, documents, a trash can, etc. As with a person's desk, a computer system's desktop can easily become cluttered making it difficult to find something located on the desktop.

Items such as an executable software program or a file can be represented on the desktop as icons. The user can initiate the software program by clicking (e.g., double or single click) on the icon using a mouse button. When a software program is initiated, an application window is opened that is used to display output and enter input associated with the application. The application window overlays the information already being displayed on the desktop. Such information may include icons displayed on the desktop or another application's window.

A GUI element such as an icon, window, or desktop can be activated or deactivated. When an element is selected, it becomes active. An activated element can be deactivated by selecting another element. To select an element, the element must be visible on the desktop. If it is covered by another element, it is impossible for the user to select the element. The element must first be found before it can be activated. This involves rearranging the items on the desktop to uncover the desired element.

Various techniques have been developed to make an element accessible. For example, in a process referred to as minimization, the size of a window can be reduced. A window can be minimized to the point that it is represented as an icon on the desktop, for example. A window can also be removed by closing it. Further, an element can be rearranged on the desktop. For example, windows can be dragged from one location on the desktop to another. The shuffling or resizing of elements on the desktop is time consuming. It can also be frustrating to the user particularly when the user needs to access to the element frequently or quickly.

Menus (such pop-up or pull-down menus) have also been used to make elements more accessible. The user clicks on a menu icon which cause the menu to be displayed. The user can click on an item in the menu to select the item. These menus are pre-configured and their entries act as a pointers to other items such as applications, folders or documents. In the Macintosh™ operating system, an apple icon in the top left-hand corner of the screen represents a menu that contains pointers to elements. To add an entry in the apple menu display, the user adds the element to an "Apple Menu Items" folder in the system's folder.

Another type of menu that is used in Windows 95 is the taskbar that exists at the bottom edge of Windows 95™ screen or desktop. The taskbar contains icons that represent open applications. To start an application, the user types in the location of the application in the system's file system, or the user selects an entry in a hierarchical menu structure (i.e., the location of the application associated with the entry has already been defined). When the application is invoked, an application window is opened on the desktop. When the application's window is minimized, an icon that represents the application remains in the taskbar. To activate the application, the user moves the cursor that is displayed on the desktop (using the mouse) to the taskbar. An option that exists in Windows 95 allows the user to hide the taskbar or remove it from sight until it is needed. The taskbar appears as a thin gray line at the bottom of the display, if this option is chosen.

The menus including the Apple menu used in the Macintosh operating system and the Windows 95 taskbar have a unitary function. In the case of the Apple menu, the menu holds pointers to an element stored in the operating system's file system. The Windows 95 taskbar holds pointers to suspended applications.

An improved user interface is described in Frank Ludolph's co-assigned U.S. Pat. No. 5,874,958, which is incorporated herein by reference. As described therein, sliding panels are used as containers for various components. The described graphical user interface (GUI) is configurable in that a user may configure sliding panels located on the edges of the main window of the GUI to contain an application that runs in the sliding panel. An application that runs in a sliding panel can be, for example, an applet, an application program, a container application that contains GUI elements and provides functionally for managing the contained elements, a software buffer, a web browser or any other suitable component.

The present invention provides an improved framework for associating components with containers, such as the sliding panel containers described in the above referenced application.

SUMMARY OF THE INVENTION

To achieve the foregoing and other objects and in accordance with the purpose of the present invention, methods and software for installing a component in a container suitable for display on a display screen as part of a graphical user interface are disclosed. In one preferred embodiment, the software (which is embodied in a computer readable medium) is configured to receive a name and desired location for a desired component. Both the desired component and a component object table that is to be associated with the component are then created. The component object table is arranged to identify both the location and identity of the component. The component object table is then referenced in a container lookup table arranged to associate the component object table with a container at the desired location.

In a preferred embodiment, the container is a sliding panel associated with a window suitable for display on the monitor. The sliding panel is capable of supporting a plurality of handles that appear to the user as independent sub-containers. The component object table includes a location identifier that identifies an edge of the window that the sliding panel is associated with, and a handle index indicative of a particular handle within the sliding panel.

In another preferred embodiment, a determination is made as to whether a container pre-exists at the desired location when a new component is to be installed. When it is determined that a container does not exist at the desired location, a suitable container is created and placed at the desired location. The component is then placed in the newly created container.

In another aspect of the invention, a component object table for use in associating a component with a container suitable for containing the component is described. The component object table is embodied in a computer readable medium and includes a number of fields including a location field, a handle field, an instance name field and a class type field. The location field holds a location identifier that identifies a location of the container relative to a window suitable for display on a display screen as part of a graphical user interface. The handle field holds a handle index indicative of a particular handle (out of a potential plurality of handles) associated with the container. The instance name field holds an instance name identifier that identifies a unique instance name of the component. The class type field holds a class name identifier that identifies the name of the specific instance that is instantiated to create the component.

In one embodiment, the component object table further includes at least one color field, as for example a background color field and/or a handle color field. The background color field holds a container color indicator that identifies a background color of a panel portion of the container that contains the component when an open panel is displayed on the a display monitor. The handle color field holds a handle color indicator that identifies a color of a handle portion of the container that contains the component when a closed handle is displayed on the a display monitor.

BRIEF DESCRIPTION OF THE DRAWINGS

The invention, together with further objects and advantages thereof, may best be understood by reference of the following description taken in conjunction with the accompanying drawings in which.

DETAILED DESCRIPTION OF THE INVENTION

As pointed out briefly above, an improved sliding panel based user interface is described in Frank Ludolph's co-assigned U.S. Pat. No. 5,874,958, As described therein, sliding panels are used as containers for various components. The described graphical user interface (GUI) is configurable in that a user may configure sliding panels located on the edges of the main GUI window to contain an application that runs in the sliding panel. An application that runs in a sliding panel can be, for example, an applet, an application program, a container application that contains GUI elements and provides functionally for managing the contained elements, a software buffer, a web browser or any other suitable component.

The user can configure a sliding panel to contain an application that could otherwise run in a window of the GUI. For example, a sliding panel can be configured to run a calendar viewer for viewing and updating a user's calendar. The calendar viewer runs in the sliding panel instead of a prior art window. The calendar viewer is always accessible by moving the cursor to the sliding panel along an edge in the main window. A configuration user interface is used to configure a sliding panel by specifying the panel's properties including the application it is to contain. A menu is provided in a configuration dialog that contains entries identifying possible applications. In addition to the entries in the configuration dialog, the user can specify a path (e.g., a URL) to an application.

In the preferred embodiment, the applications that run in the sliding panels of the invention are written in a language such as Java™. Thus, an application is a Java-based applet or a Java Bean™. A Java Bean is a reusable, distributable Java software component. The Java programming language development kit is available from Sun Microsystems, Inc.

Figure 1:
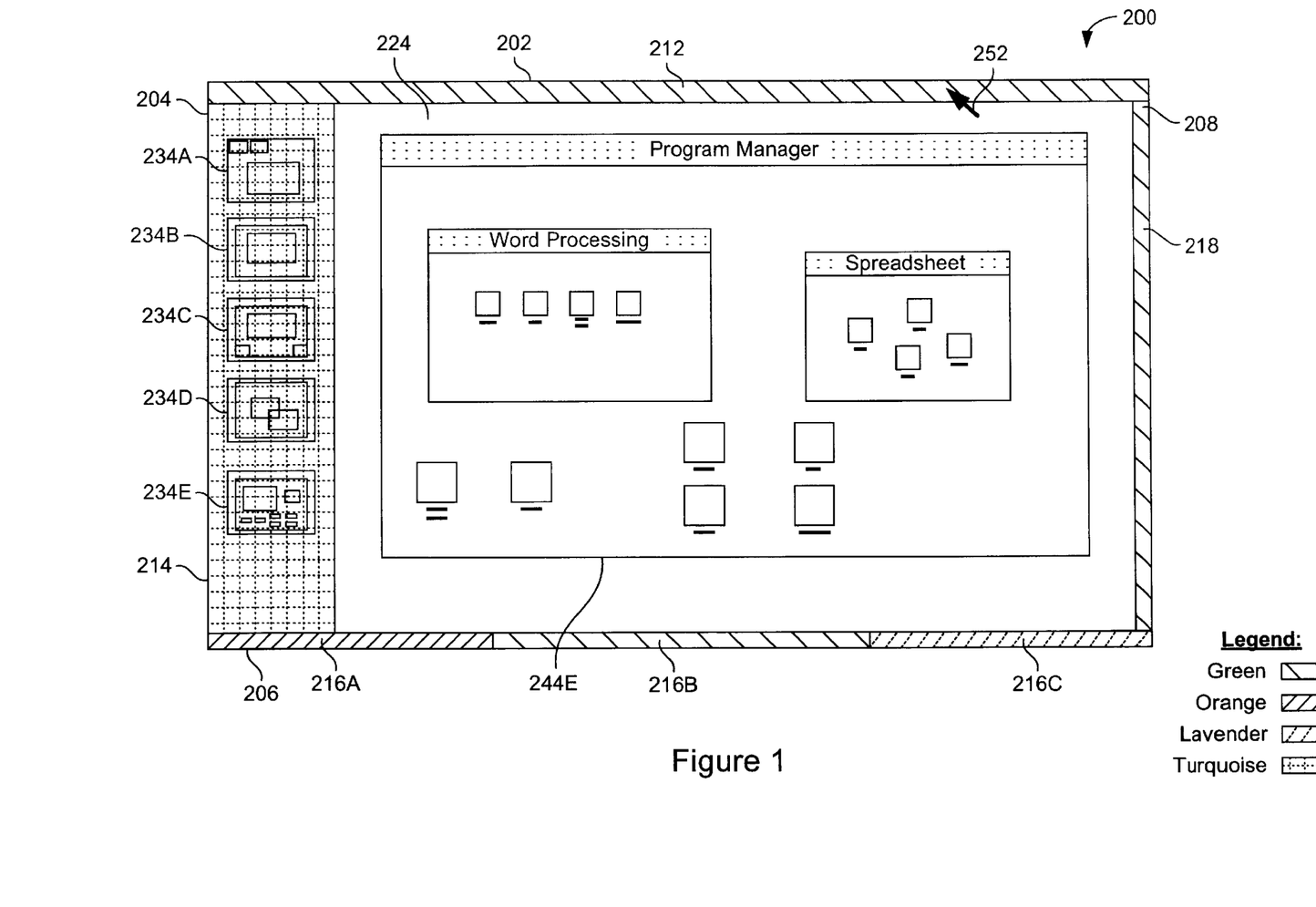
FIG. 1 is a screenshot of a window-based graphical user interface that incorporates sliding panels in accordance with one embodiment of the present invention.

FIG. 1 provides an example of a GUI having sliding panels suitable for use in conjunction with one embodiment of the invention. GUI 200 includes display area 224. Display area 224 can display one or more windows such as window 244E. GUI 200 includes a base window that has edges 202, 204, 206, and 208 that can be configured to hold panels. In one embodiment, edge 204 is configured to hold switch 214. Switch 214 includes icons 234A–234E that represent workspaces, and are selectable to move from one workspace to another.

A workspace contains a set or group of windows. For example, the windows in a Windows 95™ environment are considered a workspace. When a user switches to a different workspace, the new workspace's group of windows is displayed in display area 224. Further, the new workspace's software is activated. A currently active workspace is deactivated and its state is saved and used to reactivate the workspace.

When one of icons 234A–234E is selected, one or more windows of a workspace are displayed in display area 224. Switch 214 is used to navigate through the environments or workspaces that is available to the user. Edges 202, 206, and 208 can be configured to contain one or more sliding panels. A sliding panel is a GUI element that slides from an open state to a closed state. Sliding panel 212 on edge 202 is in a closed state, for example. In its closed state, sliding panel 212 is visible as a thin column along edge 202 (frequently referred to herein as a "handle"). Similarly, sliding panel 218 is positioned on edge 208. Edge 206 contains sliding panels 216A–216C.

Figure 2A:
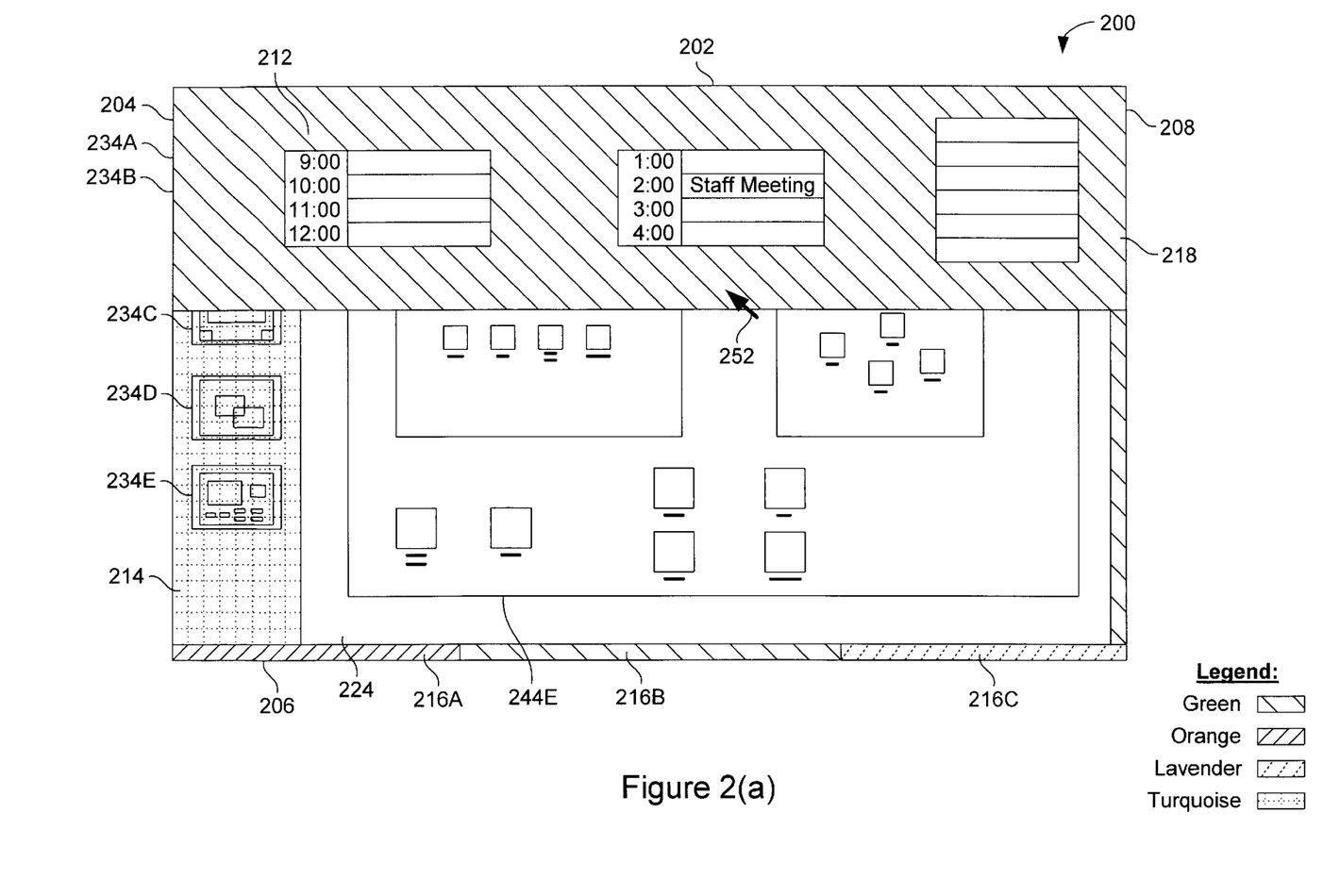
FIG. 2a is a screenshot of the graphical user interface illustrated in FIG. 1 wherein a first selected one of the sliding panels has been opened in response to a user action.

In the preferred embodiment, a unique color (as illustrated in FIG. 2a using patterning) is used to identify a particular sliding panel. In the closed state, the color is used in the closed representation of a sliding panel. In the open state, a related color is used as the sliding panel's background color. The color is used to distinguish between panels. Further, color coding can be used to match a panel in its closed state with the panel in its open state to verify that the correct panel is opened.

A sliding panel moves between the open and closed states in response to a change in position of cursor 252. When cursor 252 moves into a closed sliding panel (e.g., cursor 252 moves inside the border representing sliding panel 212 in FIG. 2*a*), the sliding panel opens. In some embodiments, when cursor 252 moves outside an open sliding panel, the sliding panel closes. In other embodiments, cursor movements outside of the panel in a particular direction (e.g. away from the main window) do not close the sliding panel to facilitate easier opening of the sliding panel. That is, the panel can be opened merely by crossing the handle of a closed sliding panel (as opposed to requiring the user to precisely position the cursor on the handle).

FIG. 2*a* provides an example of sliding panel 212 in its open state. Sliding panel 212 has been configured to contain a calendar viewer application that displays and accepts modifications to a user's calendar. In FIG. 1, sliding panel 212 is closed. To access the calendar viewer application, the user moves cursor 252 into or through the columnar representation of sliding panel 212 in FIG. 1. Sliding panel 212 slides open as illustrated in FIG. 2*a*. To close sliding panel 212, the user moves cursor 252 outside sliding panel 212.

Figure 2B:
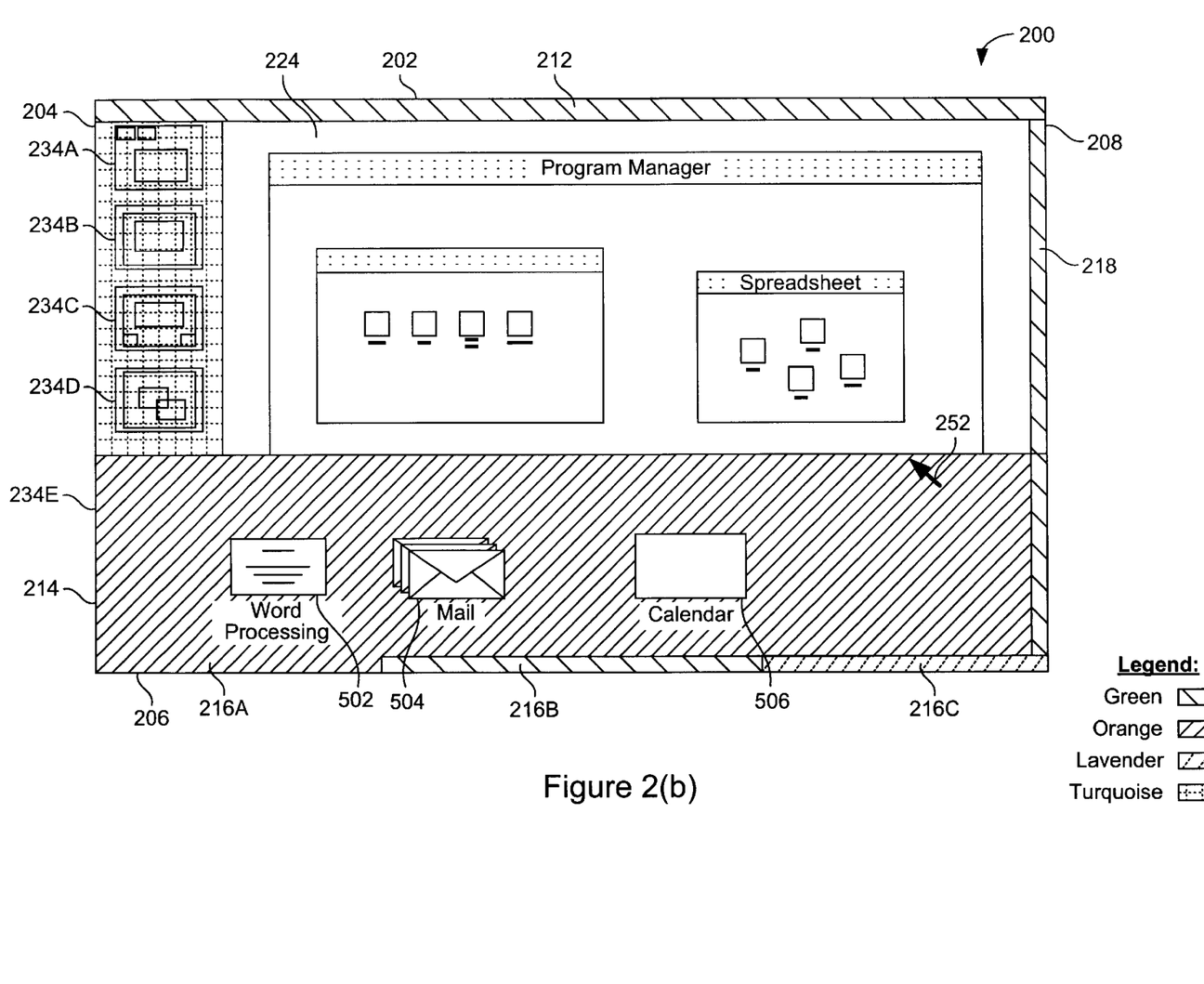
FIG. 2b is a screenshot of the graphical user interface illustrated in FIG. 1 wherein a second selected one of the sliding panels has been opened in response to a user action.

Referring back to FIG. 1, a particular sliding panel may have a plurality of separate handles which convey the image of separate sliding panels (e.g., sliding panels 216A–216C). A technique (e.g., color coding or patterning) is used to distinguish one handle from another. One of the handles 216A–216C can be selected by moving cursor 252 into the panel's closed representation. When, for example, cursor 252 is moved into handle 216A, it opens to display the output of the configured application (e.g., a drawer application). FIG. 2*b* provides an example of an open sliding panel configured for a drawer application. The drawer application is a container application. Items can be moved into a drawer. An item that is moved into the drawer is depicted as an icon that is displayed in the drawer's sliding panel. Various techniques such as drag and drop or cut and paste can be used to move an item into the drawer.

The drawer application running in sliding panel 216A contains icon 502 that points to a word processing application, for example. Icons 504 and 506 represent mail and calendar applications, respectively. To access one of these applications, the user moves cursor 252 into sliding panel handle 216A (thereby opening the panel) and selects one of icons 502–506 (e.g., by clicking on one of icons 502–506).

A sliding panel can be configured to remain open despite the position of cursor 252 (e.g., within or without sliding panel 216A). If it is not configured to remain open, the user can close sliding panel 216A by moving cursor 252 outside sliding panel 216A. If, however, the user configures it to remain open, sliding panel 216A remains open even when cursor 252 moves outside the panel. If a sliding panel is configured to remain open, another panel can be open in front of the sliding panel that is configured to remain open. Further, it is possible to configure a sliding panel to open only if cursor 252 is with the thin column that represents the panel's closed state and the mouse button is depressed.

Sliding panels handles 216B–216C are visible regardless of the state of sliding panel handle 216A. Thus, the user can select one of sliding panel handles 216B–216C by moving cursor 252 into their visible portions. When the cursor is moved through sliding panel handle 216B, sliding panel 216B slides open and sliding panel 216A is closed. Further advantages and features of the sliding panels, as well as a user interface for configuring the sliding panels is described in Frank Ludolph's co-assigned U.S. Pat. No. 5,874,958, which is incorporated herein by reference.

Figure 3:
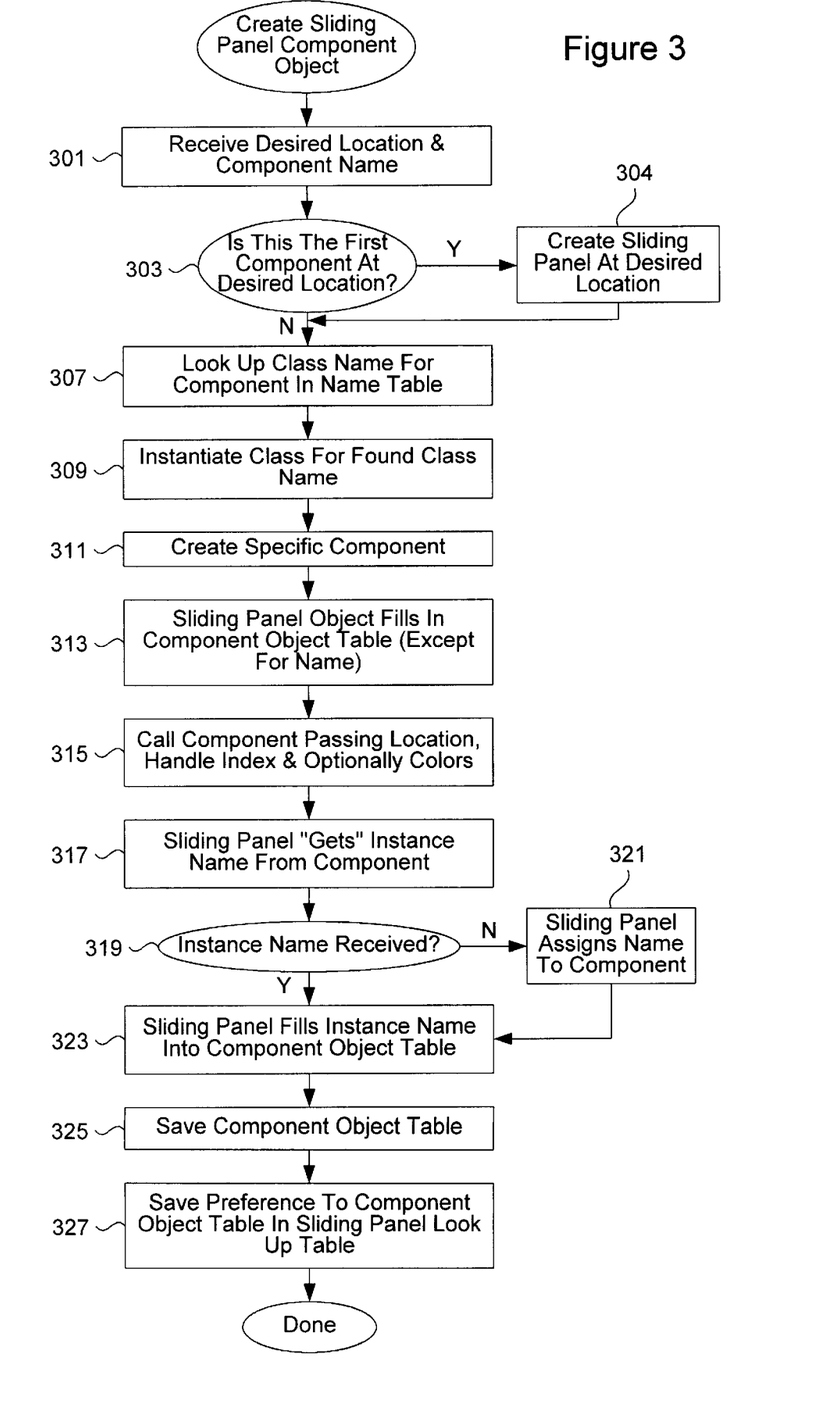
FIG. 3 is a flow diagram illustrating the method of creating a sliding panel component object in accordance with one embodiment of the present invention.

Referring next to FIG. 3, a method of creating a component object and associating the created component object with a particular container (e.g., a sliding panel) in accordance with one embodiment of the invention will be described. Initially in step 301, the system receives the name and desired location for the new component. This information can be inputted using a wide variety of mechanisms, as for example through a dedicated user interface, user initiated commands, operations or action. In some situations the object name and desired location may be received in separate operations. In others, the name and desired location may be received simultaneously as part of a request to replace a particular object in a designated container. The location identifies the desired location of the container that is to hold the identified object, while the component name is simply the user name for the object to be instantiated at the desired location. In the described embodiment, the desired location is received, as opposed to the name or identity of the particular container that is to hold the new component. As will be apparent from the description below, one advantage of this approach is that it permits the automatic creation of a container in the event that no container exists at the time the process is initiated. However, in alternative embodiments, a pre-existing container could be specifically identified in place of the location.

In the described embodiment, the containers are sliding panels that are associated with the edges of a graphical user interface or a GUI based window. Thus, in the described embodiment, the location takes the form of an edge of the panel, as for example, the top, the bottom, the right side or the left side (which are sometimes referred to herein as the north (N), south (S), east (E), and west (W) sides respectively). In alternative embodiments, the containers could be associated with other parts of a window, as for example, the edge of a panel within the window, or a frame boundary between frames.

Figure 4:
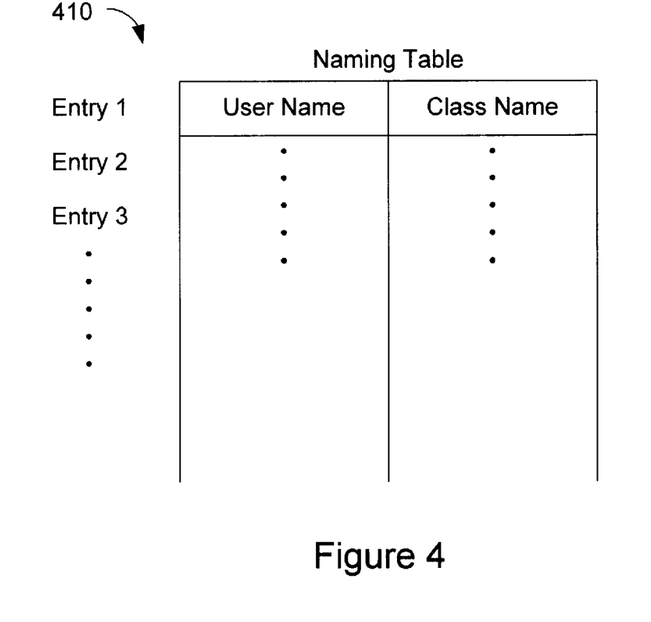
FIG. 4 is a illustration of a naming table suitable for use in conjunction with one embodiment of the present invention.

After the desired name and location for the new component has been received in step 301, a determination is made in step 303 as to whether the identified component is the first component to be positioned at the desired location. If so, it is assumed that the sliding panel container does not yet exist at the desired location so the logic flows to step 304 where an appropriate sliding panel is created at the desired location (i.e. N, S, E or W). In the described embodiment, the container is a sliding panel and thus a sliding panel is created in the desired location. However, in alternative embodiments, an appropriate alternative container mechanism could be provided. After the container has been created at the desired location in step 304, or if the container was already in existence in step 303 (i.e., this was not the first component at the desired location), then the logic flows to step 307 where the class name for the identified object is looked up in a naming table. By way of example, the simple naming table 410 of FIG. 4 may be used for this purpose. As seen therein, each entry in the naming table 410 may simply include a user name for specific component objects and the associated class name for such objects. After the class name for the identified component has been found the identified class is instantiated in step 309 and the specific component is thereafter created in step 311. In the described embodiment, the instantiation and creation step are separated. In alterate embodiment, it may be possible to combine these steps.

Figure 5:
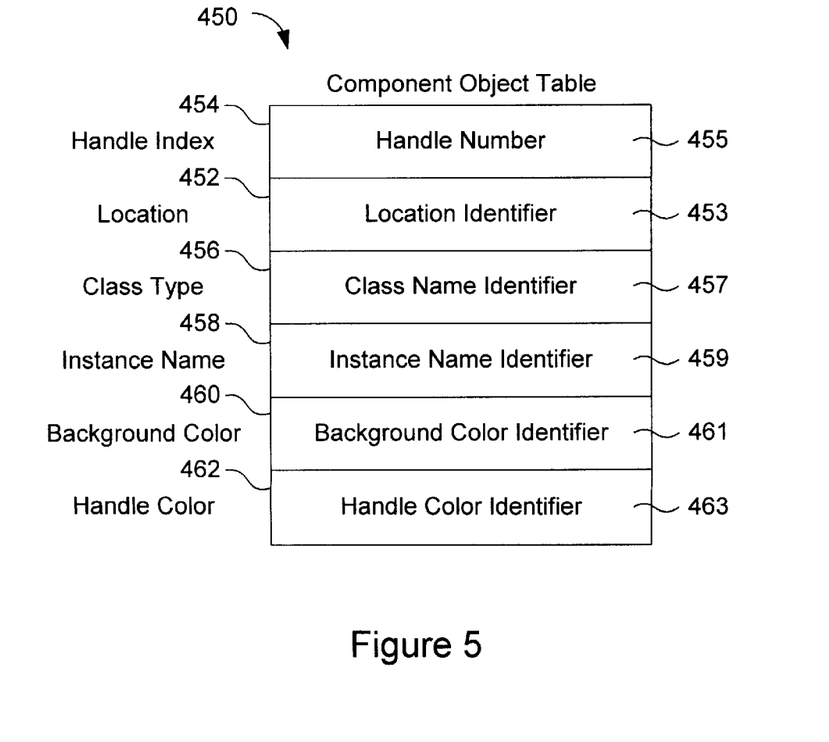
FIG. 5 is a diagrammatic representation of a sliding panel component object table in accordance with one embodiment of the present invention.

After the sliding panel component has been created in step 311, a new component object table object 450 that is to be associated with the newly created component is instantiated. Then the sliding panel container object at least partially fills in the component object table in step 313. Referring next to FIG. 5, the component object table 450 may include a number of fields that are useful in locating, identifying and handling the associated component object. In the embodiment shown, the component object table 450 has six fields. They include a location field 452, a handle index field 454, a class type field 456, an instance name field 458, a background color field 460 and a handle color field 462. The location field 452 receives a location identifier 453 that identifies the location of the sliding panel that contains the associated component. As described above, the sliding panels may be associated with a particular edge of the GUI screen itself or a GUI based window. In this embodiment, the location may simply correspond to the particular edge that the sliding panel that houses the associated component is located on (e.g. N, S, E or W).

The handle index field 454 contains a handle number 455 that indicates the particular sliding panel handle that contains the associated component. As described above, a plurality of sliding panels (referred to herein as sliding panel handles) may be associated with any particular edge. In the illustrated embodiment, any edge may have up to nine distinct handles, although the actual number of handles permitted in alternative embodiments may vary widely based on the requirements of particular system, the size of the display screen, etc.

The class type field 456 contains a class name identifier 457 which identifies the class name of the associated component that is instantiated within the associated panel. The instance name field 458 includes an instance name identifier 459 that identifies the particular instance of the component that is instantiated within the associated panel.

The background color field 460 includes a background color identifier 461 that identifies the background color of the associated sliding panel in its open state. And the handle color field 462 includes a handle color identifier 463 that identifies the color of the associate handle in the sliding panel's closed state. Although from the standpoint of the framework, there is no need for the background color and the handle color to be closely associated, it is believed to be particularly useful from the user interface standpoint to have these colors closely related. When these colors are closely related, the background color of an open panel gives a visual feedback as to the particular handle that is open. In some embodiments, the color of the panel background and the handle will be exactly the same color. In others they may be shades of one another.

Referring back to the flow chart of FIG. 3, the component object table 450 fields that are initially filled in by the sliding panel container may vary widely depending upon the optimizations chosen by a particular system. By way of example, in the described embodiment the sliding panel container object fills in a location field 452 that identifies the location of the associated sliding panel (i.e., the north, south, east or west edge of the active window); an index field 454 that identifies the handle number within the associated sliding panel that the component object is to be located in; and a class type field 456 which identifies the class of the newly created component object. The sliding panel container object may fill in additional fields within the component object table 450 such as the background color and handle color fields 460, 462 at this time as well.

After the sliding panel container object has at least partially filled in the component object table in step 313, the location (e.g. N, S, E or W) and handle index number of the associated sliding panel are passed from the sliding panel container object to the newly created component object in step 315. The location values passed to the component object are the values received in step 301 and simply inform the newly created component of its location. Other parameters of interest to the component such as handle color and/or the desired background color for the associated sliding panel may be passed to the newly created component as well.

Once the necessary parameters have been passed to the newly created component, the sliding panel attempts to "get" the name of the newly created component (i.e. the instance name) in step 317. In the described embodiment the sliding panel performs a get name call to the newly created component object. If the get name operation is successful, (as determined in step 319) then the logic proceeds to step 323 where the sliding panel fills in the instance name field in the component object table using the name returned from the get name operation. On the other hand, if in step 319 it is determined that the get name operation was not successful (that is the queried component was unable to return its instance name), then the logic proceeds to step 321 where the sliding panel assigns a name to the newly created component. Thereafter, the logic proceeds to step 323 where the sliding panel fills in the instance name field in the component object table using the assigned name. If there are other component object table fields that remain, they may be filled in at this time as well.

Figure 6:
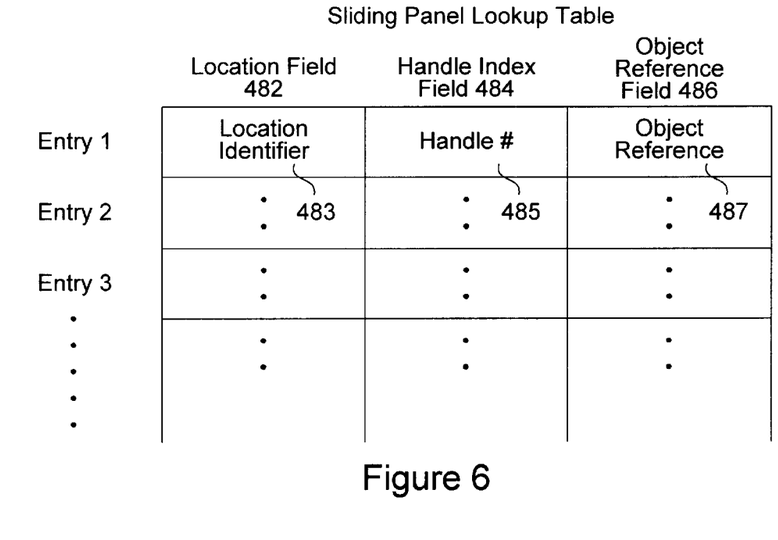
FIG. 6 is a diagrammatic representation of a sliding panel look-up table in accordance with one embodiment of the present invention.

Once the sliding panel has filled in the appropriate fields in the component object table 450 in step 323, the sliding panel component object table is saved in step 325. Thereafter a reference to the sliding panel component object table 450 is saved in a sliding panel lookup table 480. By way of example, one suitable sliding panel lookup table 480 is illustrated in FIG. 6. In the embodiment shown, each entry in the lookup table 480 includes a location field 482 that holds a location identifier 483 that identifies the container that holds the newly created component (i.e. the sliding panel that holds the component); a handle index field 484 contains a handle number 485 that identifies the handle that the newly created component is associated with; and an object reference field 486 that contains an object reference that identifies the component object table associated with the newly created component. It is noted that since Java was written with a view towards is a distributed, object oriented environment, object references are used to identify other objects instead of pointers. Accordingly, in the described embodiment, each of the described items, including the sliding panels, the various tables, the components, etc. are each independent objects that may be identified though their object references. However, in alternative embodiments, pointers or other conventional mechanism can be used to identify the associated component object table. After the sliding panel lookup table 480 has been filled in, the newly created object has been installed in the sliding panel container and the process is complete. At this point a user is able to freely access the installed component through the use of the associated sliding panel.

Figure 7:
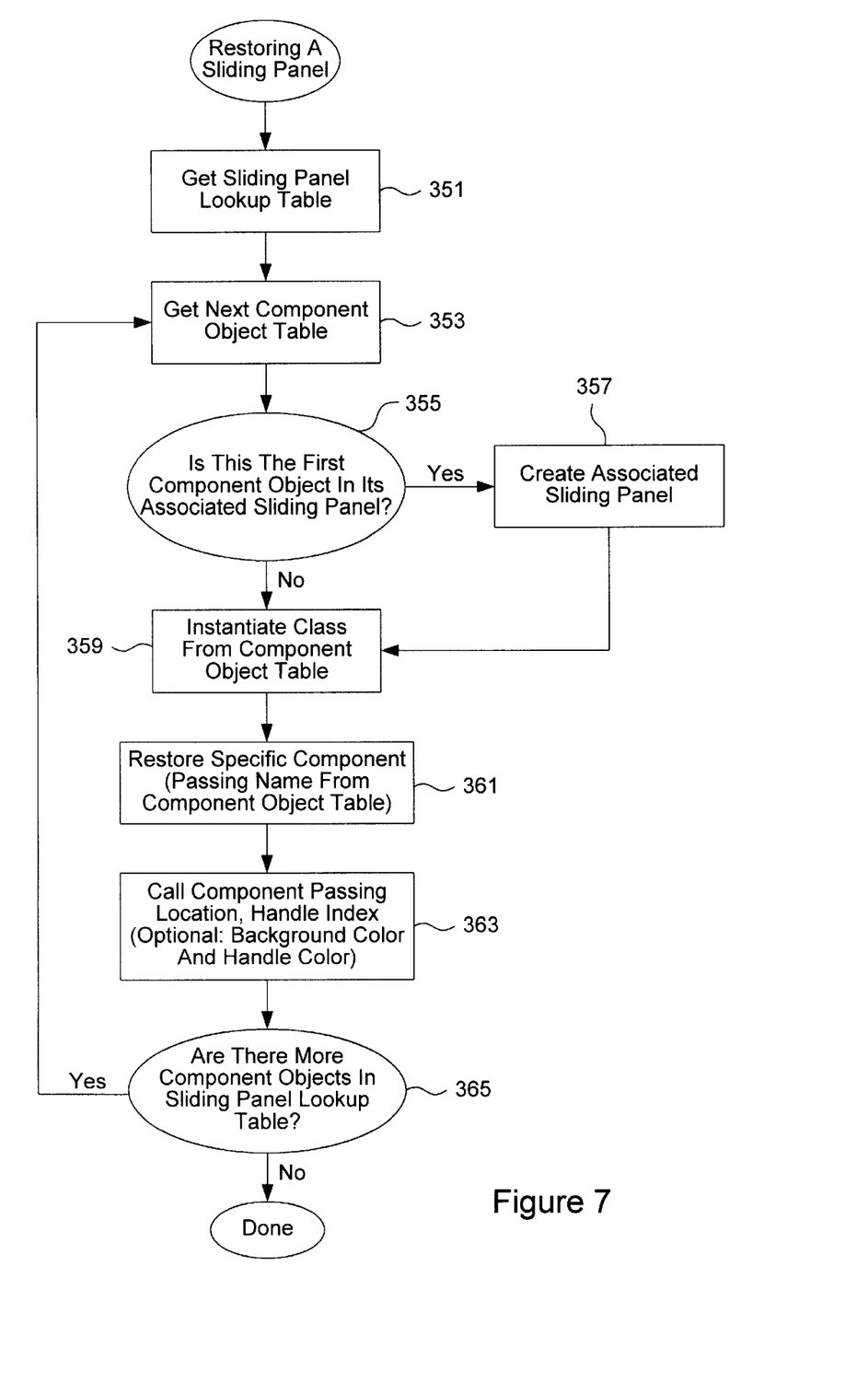
FIG. 7 is a flow diagram illustrating a method of restoring a sliding panel in accordance with one embodiment of the present invention.

As will be appreciated by those skilled in the art, when the base application or base window that contains the sliding panel container (the Java SW Editor frame in one preferred embodiment) is deactivated, all of the components within the application will be deactivated as well. Thus, the sliding panels and the components within the sliding panels would all be closed. When the base window is reactivated, then the sliding panels, as well as the components within the sliding panels must all be restored. Referring next to FIG. 7, a method of restoring a sliding panel in accordance with one embodiment of the invention will be described. Initially, in step 351 the sliding panel look-up table 480 is retrieved from memory. After the sliding panel look-up table has been retrieved, the component object table associated with the first one of the components stored in the sliding panel will be retrieved in step 353. Then, in step 355 a determination is made as to whether the retrieved component object table corresponds to the first sliding component stored in its associated sliding panel container. If so, then the associated sliding panel does not yet exist and must be created in step 357. Since all of the sliding panels must be recreated when the base window is activated, a first sliding panel will typically have to be created in the first pass. After the first sliding panel has been created in step 357, the logic flows to step 359 where the class for the associated component is instantiated. As described above, the class name is found in the class type field 456 of the component object table 450.

After the component class has been instantiated, a restore operation is made for the current component in step 361, passing the instantiated object its name (which is also found in the instance name field 458 in component table 450). After the component has been restored in step 361, the component is called passing the location identifier 453, the handle number 455 and any other desired parameters in step 363. It should be appreciated that step 363 is directly analogous to step 313 in the object creation procedure described above with reference to FIG. 3. After the restored component has received the necessary parameters from the component object table in step 363, the logic proceed to step 365 where a determination is made as to whether there are more components objects referenced in the sliding panel look-up table. If so, the logic returns to step 353 where the next component in the object table is retrieved and the process of steps 353–365 is repeated thereby restoring each of the components identified in the sliding panel look-up table.

In the embodiment of the look-up table described above with reference to FIG. 6, a single sliding panel look-up table 480 references all of the available sliding panels. Thus, when the second component is retrieved from the component object table in step 353, it may or may not be the first component in its associated sliding panel. When a particular retrieved component is the first component in its associated sliding panel, this fact is detected in step 355 and the associated sliding panel is created in step 357 as described above with respect to the first pass. On the other hand, in many circumstances, the retrieved component may not be the first component in its associated sliding panel. In those circumstances, the determination made in step 355 is negative and the class identified in the component object table may be directed instantiated in step 359, thereby skipping step 357.

After all of the components identified in the sliding panel look-up table have been restored, the determination in step 365 will be that there are not any more component objects identified in the sliding panel look-up table and the restoration of the sliding panel is complete.

Figure 8:
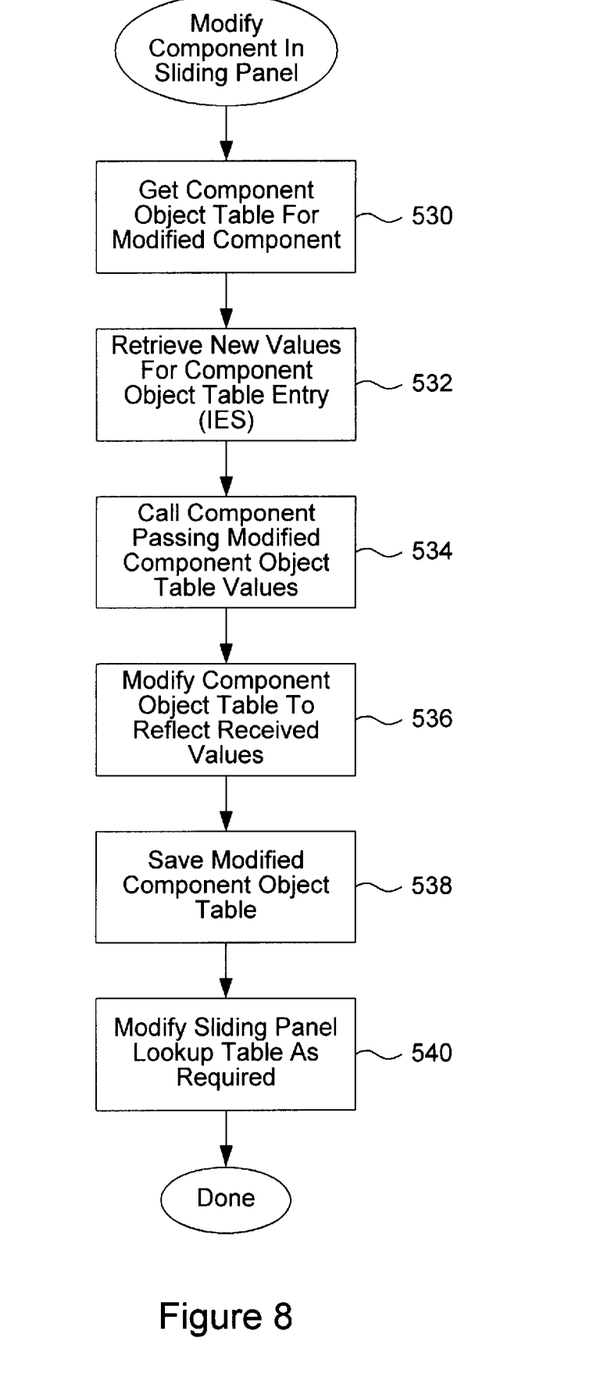
FIG. 8 is a flow diagram illustrating a method of modifying a sliding panel component object in accordance with one embodiment of the present invention.

During the course of usage of the sliding panels, it may be desirable to alter the characteristics of a particular component in one of the sliding panels. By way of example, a particular component could be moved to another handle or another sliding panel, the color associated with the panel could be modified, etc. Referring next to FIG. 8, a method suitable for modifying the nature of a component within a sliding panel will be described. When a modification is desired, the component object table 450 associated with the modified component stored in the modified panel is retrieved in step 530. After the component object table has been retrieved, the new values for the component object table are received in step 532. The new values could correspond to a new location and/or handle for the associated component, a new panel color, etc. After the new values have been received, they are passed to the modified sliding panel component in step 534. In effect, the affected component is informed of the change. Then in step 536, the component object table itself is modified to reflect the newly received values and the modified component object table is saved in step 538. Thereafter, in step 540, the sliding panel lookup table is modified (if necessary) to reflect any new location information (e.g. location, handle index), required by the modification. At this point, the modification is completed. The modification instructions can be entered in any suitable manner, as for example using the user interface described in the above-referenced patent application.

Figure 9:
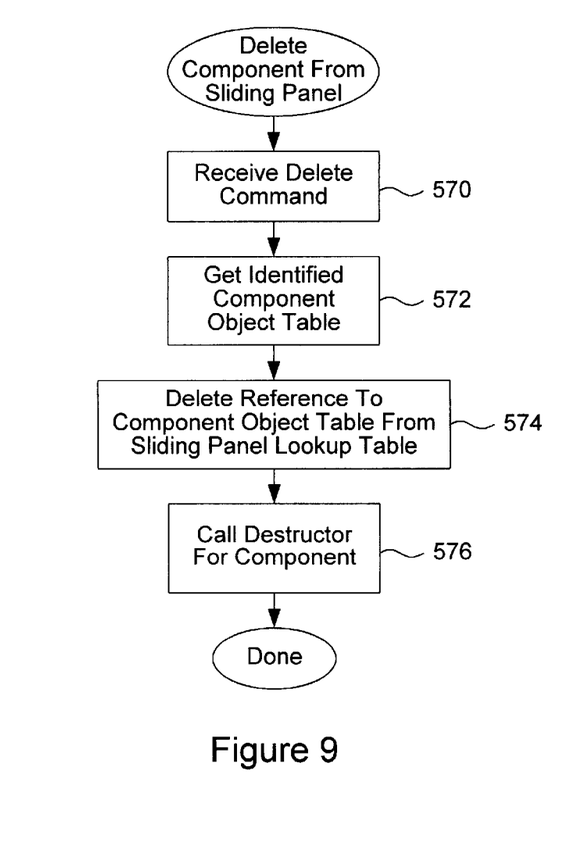
FIG. 9 is a method of deleting a sliding panel component object in accordance with one embodiment of the present invention.

Referring next to FIG. 9, a method of deleting component objects from their associated sliding panels will be briefly described. Initially, in step 570, a command is entered to delete a particular component. The delete command can be received either by the component itself or an external object. The component to be deleted (or the external object) then calls a delete method identifying the component to be deleted both by name (i.e. both class name and instance name) and location (i.e. both location and handle index). After the delete component command is received in step 570 the identified component object table is fetched in step 572 using a Java based get command.

It should be recalled that the component object table 450 is referenced in the sliding panel look-up table 480 and thus the corresponding entry in the sliding panel look-up table is deleted in step 574. After the corresponding entry in the sliding panel look-up table 480 has been deleted the appropriate destructor method associated with the component identified for deletion is called in step 476. The destructor then destroys both the component itself and the associated component object table 450. At this point the deletion of the component is complete.

Figure 10:
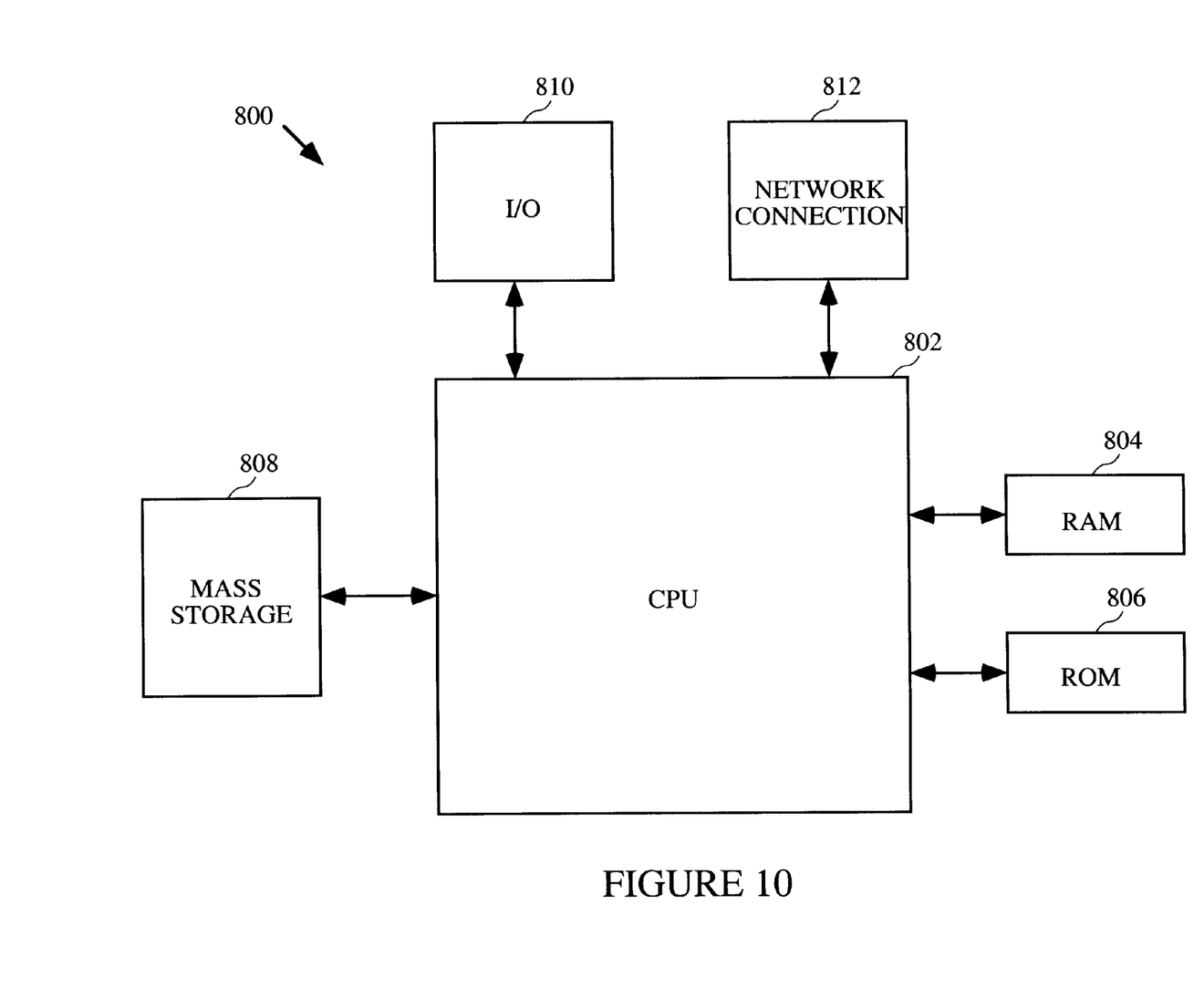
FIG. 10 is a block diagram of a general purpose computer system suitable for implementing for the present invention.

FIG. 10 is a schematic illustration of a general purpose computer system suitable for implementing the present invention. The computer system includes a central processing unit (CPU) 802, which CPU is coupled bidirectionally with random access memory (RAM) 804 and unidirectionally with read only memory (ROM) 806. Typically RAM 804 includes programming instructions and data, including text objects as described herein in addition to other data and instructions for processes currently operating on CPU 802. ROM 806 typically includes basic operating instructions, data and objects used by the computer to perform its functions. In addition, a mass storage device 808, such as a hard disk, CD ROM, magneto-optical (floptical) drive, tape drive or the like, is coupled bidirectionally with CPU 802. Mass storage device 808 generally includes additional programming instructions, data and text objects that typically are not in active use by the CPU, although the address space may be accessed by the CPU, e.g., for virtual memory or the like. Each of the above described computers further includes an input/output source 810 that typically includes input media such as a keyboard, pointer devices (e.g., a mouse or stylus) and the like. Each computer can also include a network connection 812 over which data, including, e.g., text objects, and instructions can be transferred. Additional mass storage devices (not shown) may also be connected to CPU 802 through network connection 812. It will be appreciated by those skilled in the art that the above described hardware and software elements are of standard design and construction.

Although only a few embodiments of the present invention have been described, it should be understood that the present invention may be embodied in many other specific forms without departing from the spirit or scope of the invention. By way of example, although the various steps in the described embodiments have been set forth in terms of a particular sequential order for the purposes of this explanation, it should be apparent that in many cases the ordering of specific steps is not critical. Some steps may be combined or eliminated and others may be parsed into multiple steps. The same functionality can also be obtained using different steps as well. Further, the various tables have been described as having particular data structures, however, some of the described fields may be eliminated in some embodiments, and other fields may be added. For example, one or both of the color fields of the component object table could be readily eliminated. Additional fields could be added as well to dictate other features relating to the associated container. By way of example, the user could be given the ability to modify the opening and closing or other behaviors of the sliding panel containers. In such systems, it may be desirable to add additional fields to the component object table to reflect these behaviors.

The sliding panel lookup table has been described as though a single table covers all of the sliding panels. Alternative embodiments could use separate lookup tables for each sliding panel. In many cases, altering the data structures would require corresponding changes in the described methods. Therefore, the present examples are to be considered as illustrative and not restrictive, and the invention is not to be limited to the details given herein, but may be modified within the scope of the appended claims.

What is claimed is:

1. A method of installing a component in a container suitable for display on a display screen as part of a graphical user interface, the method comprising the steps of:

receiving an indication of a desired placement for a desired component, the desired placement being within a particular container suitable for display on a monitor;

receiving a name for the desired component;

creating the desired component after receipt of the name of the desired component;

creating a component object table to be associated with the created component, the component object table being arranged to identify a location of the component and the identity of the component; and referencing the component object table in a container lookup table, the container lookup table being arranged to associate the component object table with a container at the desired location, wherein the container is suitable for display on a display screen as part of a graphical user interface.

2. A method as recited in claim 1 wherein the container is a sliding panel associated with a window suitable for display on the monitor and the created component is a sliding panel component contained within the sliding panel.

3. A method as recited in claim 2 wherein:

the sliding panel is capable of supporting a plurality of handles that act as independent sub-containers; and the component object table includes a location identifier that identifies an edge of the window that the sliding panel is associated with, and a handle index indicative of a particular handle within the sliding panel.

4. A method as recited in claim 1 wherein the component object table includes a location field for holding a location identifier that identifies the location of the associated container, and a handle field for holding a handle index indicative of a particular handle associated with the container, the container being capable of supporting a plurality of distinct handles.

5. A method as recited in claim 4 wherein the component object table further includes an instance name field for holding an instance name identifier that identifies a unique instance name of the component, and wherein the instance name field is filled in by the container; and a class type field for holding a class name identifier that identifies the name of a class that is instantiated to create the component, and wherein the class name field is filled in by the component.

6. A method as recited in claim 4 wherein the location identifier and handle index are placed in the component object table by the component.

7. A method as recited in claim 1 wherein the desired component creating step includes instantiating a class corresponding to the received name for the desired component, wherein the created component appears to run within the container.

8. A method as recited in claim 1 further comprising the step of creating the container in response to the receipt of the desired placement.

9. A method as recited in claim 1 further comprising the step of:

determining whether a container exists at the desired placement; and when it is determined that a container does not exist at the desired placement, creating the container.

10. A method as recited in claim 1 wherein the desired placement is indicated by identifying a desired location.

11. A method as recited in claim 1 wherein the desired placement is indicated by identifying the particular container.

12. A computer readable medium including programmed instructions arranged to install a component in a container suitable for display on a display screen as part of a graphical user interface, the computer readable medium including programmed instructions for:

receiving a desired location for a desired component, the desired location being within a particular container suitable for display on a monitor;

receiving a name for the desired component;

creating the desired component after the receipt of the name of the desired component;

creating a component object table to be associated with the created component, the component object table being arranged to identify the location of the component and the identity of the component; and referencing the component object table in a container lookup table, the container lookup table being arranged to associate component object tables with specific containers.

13. A component object table for use in associating a component with a container suitable for containing the component, the component object table being embodied in a computer readable medium and comprising:

a location field for holding a location identifier that identifies a location of the container relative to a window suitable for display on a display screen as part of a graphical user interface;

a handle field for holding a handle index indicative of a particular handle associated with the container, the container being capable of supporting a plurality of distinct handles that act as independent sub-containers;

a instance name field for holding a instance name identifier that identifies a unique instance name of the component; and a class type field for holding a class name identifier that identifies the name of the component that is instantiated within the associated container.

14. A component object table as recited in claim 13 further comprising:

a background color field for holding a container color indicator that identifies a background color of a panel portion of the container that contains the component when the panel is displayed on the a display monitor; and a handle color field for holding a handle color indicator that identifies a color of a handle portion of the container that contains the component when the handle is displayed on the a display monitor.

15. A plurality of component object tables as recited in claim 13 wherein:

each component object table associates a unique component with an associated container handle; and each container handle may be associated with a plurality of unique components.

16. A system comprising:

a window suitable for display on a display screen as part of a graphical user interface;

a sliding panel container associated with a boundary of the window, the sliding panel container being suitable for display as a part of the graphical user interface;

a component contained in the sliding panel container;

a component object table for associating the component with the sliding panel container; and a sliding panel table for associating the sliding panel container with the component object table.

17. A system as recited in claim 16 wherein the sliding panel container is capable of supporting a plurality of distinct handles that act as independent sub-containers and the component object table includes:

a location field for holding a location identifier that identifies a particular boundary window that the sliding panel container is associated with;

a handle field for holding a handle index indicative of a particular handle associated with the sliding panel container, the sliding panel container being capable of supporting a plurality of distinct handles;

a instance name field for holding a instance name identifier that identifies a unique instance name of the component; and a class type field for holding a class name identifier that identifies the name of a that is instantiated to create the component.

18. A system as recited in claim 14 wherein:

a plurality of components are provided with each component having a unique component object table associated therewith:

the sliding panel table is arranged to hold a multiplicity of entries, with one entry in the sliding panel table being provided for each component; and each entry in the sliding panel table includes an object reference that identifies a particular one of the component object tables and a sliding panel identifier that identifies the sliding panel container that contains the component that the component object table is associated with.

19. A method of modifying a component in a container suitable for display on a display screen as part of a graphical user interface, the method comprising the steps of:

receiving a component object table associated with a modified component stored in the container;

receiving new values for the component object table;

updating the component object table with the values; and updating a container lookup table associated with the component with the values.

20. A method as recited in claim 19 wherein the new values include one of a location, a background color, a handle color, and a handle for the associated component.

21. A method of installing a component in a container suitable for display on a display screen as part of a graphical user interface, the method comprising the steps of:

receiving an indication of a desired placement for a desired component, the desired placement being within a particular sliding panel suitable for display on a monitor, the sliding panel being capable of supporting a plurality of handles that act as independent sub-containers;

receiving a name for the desired component;

creating the desired sliding panel component;

creating a component object table to be associated with the created component, the component object table including a location identifier that identifies an edge of a graphical user interface feature that the sliding panel is associated with, and a handle index indicative of a particular handle within the sliding panel; and referencing the component object table in a container lookup table, the container lookup table being arranged to associate the component object table with a container at the desired location, wherein the container is suitable for display on a display screen as part of a graphical user interface.

22. A method as recited in claim 21 wherein the desired sliding panel component creating step includes instantiating a class corresponding to the received name for the desired sliding panel component and the component object table further includes an instance name field for holding an instance name identifier that identifies a unique instance name of the component, and wherein the instance name field is filled in by the container; and a class type field for holding a class name identifier that identifies the name of a that is instantiated to create the component, and wherein the class name field is filled in by the component.

23. A method as recited in claim 21 further comprising:

determining whether a container exists at the desired placement; and when it is determined that a container does not exist at the desired placement, creating the container.

24. A method as recited in claim 21 wherein the created sliding panel component is arranged to run within the particular sliding panel.

* * * * *